US007312441B2

(12) United States Patent
Land et al.

(10) Patent No.: US 7,312,441 B2
(45) Date of Patent: Dec. 25, 2007

(54) METHOD AND APPARATUS FOR CONTROLLING THE ION POPULATION IN A MASS SPECTROMETER

(75) Inventors: Adrian Land, San Carlos, CA (US); Lee Earley, Mountain View, CA (US); Mark Hardman, Sunnyvale, CA (US); Rexford T. Heller, San Jose, CA (US); Michael W. Senko, Sunnyvale, CA (US)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 11/077,105

(22) Filed: Mar. 9, 2005

(65) Prior Publication Data

US 2006/0016976 A1 Jan. 26, 2006

Related U.S. Application Data

(63) Continuation-in-part of application No. 11/021,224, filed on Dec. 23, 2004, now abandoned.

(60) Provisional application No. 60/585,105, filed on Jul. 2, 2004.

(51) Int. Cl.
*B01D 59/44* (2006.01)

(52) U.S. Cl. ...................................... 250/282; 250/288

(58) Field of Classification Search ................ 250/283, 250/282

See application file for complete search history.

(56) References Cited

U.S. PATENT DOCUMENTS 5,448,061 A 9/1995 Wells
5,479,012 A 12/1995 Wells
5,572,022 A * 11/1996 Schwartz et al. ........... 250/282
6,555,814 B1 4/2003 Baykut et al.
6,958,473 B2 * 10/2005 Belov et al. ................ 250/282
2004/0200959 A1 10/2004 Kovtoun

FOREIGN PATENT DOCUMENTS

EP 0 905 743 A1 3/1999
WO WO 2004/068532 A2 8/2004

OTHER PUBLICATIONS

D.A. Gedcke, Dealing with Dead Time Distortion in a Time Digitizer, ORTEC, p. 1-14.*

Belov, Mikhail, E. et al, "Automated Gain Control and Internal Calibration with External Ion Accumulation Capillary Liquid Chromatography-Electrospray Ionization-Fourier Transform Ion Cyclotron Resonance.," Anal. Chem., vol. 75 (No. 16), p. 4195-4205, (Aug. 15, 2003).

D. A. Gedcke, "Dealing with Dead Time Distortion in a Time Digitizer," Application Note—AN57, ORTEC (USA), p. 1-15.

* cited by examiner

*Primary Examiner*—David A. Vanore
(74) *Attorney, Agent, or Firm*—Fish & Richardson P.C.; Sharon Upham; David E. Allred

(57) ABSTRACT

A method of controlling the population of ions in a mass spectrometer in which a first sample of ions is provided in the mass spectrometer, a measure of abundance of a species of interest in the first sample of ions is determined, the measure of abundance comprising an intensity value, and a second sample of ions is introduced into the mass spectrometer. The second sample of ions is introduced in an amount determined at least in part on the measure of abundance of the species of interest in the first sample of ions.

38 Claims, 3 Drawing Sheets

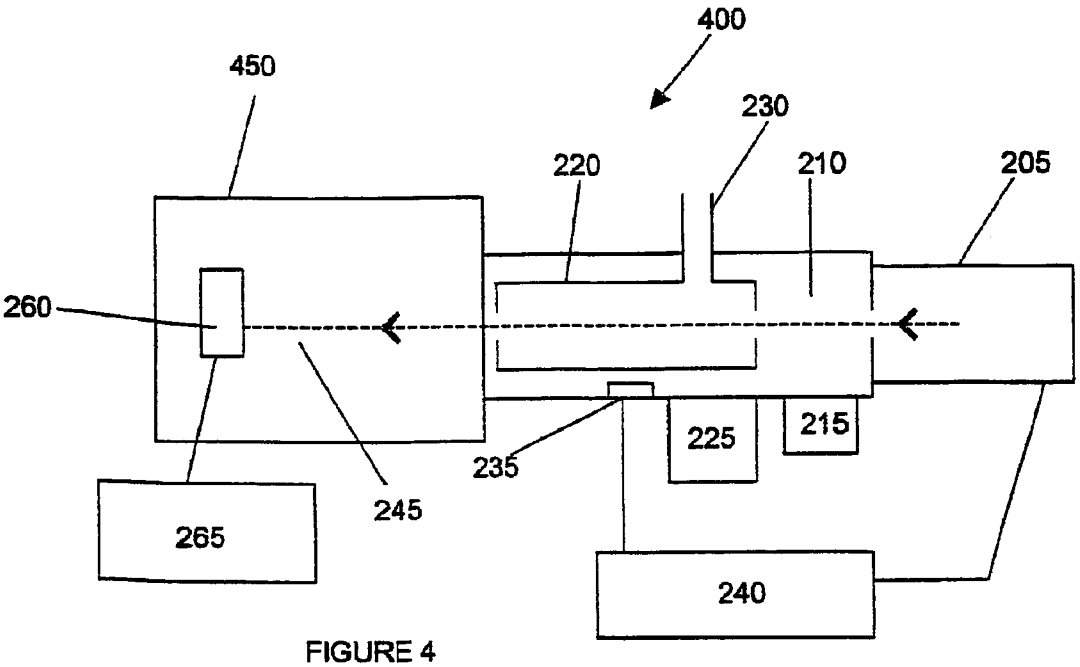
FIGURE 4
FIGURE 5
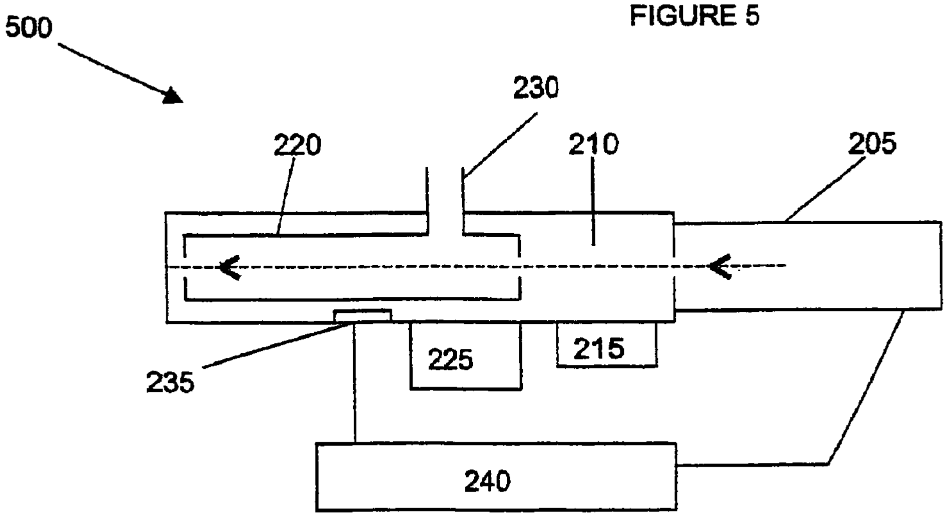

METHOD AND APPARATUS FOR CONTROLLING THE ION POPULATION IN A MASS SPECTROMETER

CROSS-REFERENCE TO RELATED APPLICATIONS

This application is a continuation-in-part of U.S. patent application Ser. No. 11/021,224, filed Dec. 23, 2004 now abandoned, which claims priority to Provisional Application Ser. No. 60/585,105, filed Jul. 2, 2004, which applications are incorporated by reference herein in their entirety.

BRIEF DESCRIPTION

The invention relates to controlling the ion population in a mass spectrometer, and in particular a time-of-flight mass spectrometer.

BACKGROUND

All mass spectrometers use detection systems with limited signal intensity measurement capabilities. If a signal more intense than the detector's upper limit is measured, the detector becomes saturated. The result of saturation is an inability to accurately measure both the signals intensity and location. Detector saturation can result both in reduced data quality, and a reduced ability of an automated mass spectrometer to appropriately set subsequent operating parameters. If the detector is saturated during the course of a prescan measurement, the results will be an underestimation of the number of ions. Any subsequent analytical scan based upon this prescan would be subject to an unintentionally large ion population with the potential of creating undesirable charge effects or further detector saturation.

Time of flight mass spectrometry (TOFMS) allows high resolution, high accuracy, full scan sensitivity spectra to be attained. TOFMS is based upon the principle that ions of different mass to charge ratios travel at different velocities such that a packet of ions accelerated to a specific kinetic energy separates out over a defined distance according to the mass to charge ratio. By detecting the time of arrival of ions at the end of the defined distance, a mass spectrum can be built up.

TOFMS can be operated in a so-called cyclic mode, in which successive bunches of ions are accelerated to a kinetic energy, separated in flight according to their mass to charge ratios, and then detected. The complete time spectrum in each cycle is detected and the results added to a histogram.

One of the primary challenges in TOFMS is to maximize the dynamic range of the device. This is primarily limited by the processing of the signal from the ion detectors: not only must the number of ions arrived be counted, but also the time at which the ions arrive. This data must be obtained and output before the next set of data can be processed.

The earliest TOFMS devices employed analogue to digital converters (ADC) to digitize the output of an amplifier connected to a collector electrode. The collector electrode in turn received electrons generated by one or more microchannel plate electron multipliers when ions impinged thereon. The output of the multiplier was coupled to a transient recorder or a digital sampling oscilloscope.

Although ADC data acquisition systems do not suffer from the drawbacks of time to digital converters (TDC) (see below), the dynamic range of high speed ADCs is still relatively limited.

Typically, the TOFMS uses a time to digital converter (TDC) detector which employs ion counting techniques to allow a mass spectrum to be generated. However a TDC has a dynamic range of one bit, that is, if more than one ion arrives within a TDC time bin, then the TDC only registers a single count. The impact of a single ion is converted to a first binary value, e.g., 1 and the lack of impact is represented as a second binary value (e.g., 0). This data can then be processed via various timers and/or counters.

The advantage of a TDC over the analogue detection technique described above is that the signal output from the electron multiplier in respect of each ion impact is treated identically so that variations in the electron multiplier output are eliminated. There is, however, a limit to the dynamic range of a TDC detector, caused by a so-called dead time associated with ion detection. Dead-time is the time immediately following the recordal of an event (in this case the arrival of an ion) during which no further ion arrivals can be registered. If a subsequent ion arrives within the dead-time it will not be registered, whereas if it arrives after the dead-time, it will be registered. Thus, at higher ion fluxes, the total of ions arriving may be significantly more than the number actually detected.

Dead-time can also be extended by the arrival of a second ion, arriving within the first ion's dead-time and not being counted, yet still adding onto the already existing dead-time of the first ion. Dead-time arises from multiple sources, e.g., pulse width from the electron multiplier, delay within discriminators, and/or the time bin width of the TDC.

Ultimately, dead-time leads to peak distortion, and the observed peak is reduced in absolute height, since fewer ions are registered. The non-registering of ions can also cause mass shifts to occur.

FIG. 1 illustrates how not only does the dead time cause suppression of the area of the peaks, but the peak is shifted. In FIG. 1, shows a plot of the ions counted on the vertical axis and the time bins on the horizontal axis. Curve 110 represents a situation in which all ions that arrive at the TDC detector arrive far enough apart in time such that dead-time is not an issue, and each individual ion is accounted for and counted. The peak intensity is shown by 120, and it occurs at a time of 130. Curve 140 represents a situation in which multiple ions arrive at the TDC detector within the same time bin, where dead-time is an issue, and some individual ions are not counted. The peak intensity is shown by 150, which is lower than 120, and occurs at a time of 160, a point that is shifted in the time domain from that of 130. The shift in the centroid of the peak will ultimately cause an error in the measured value for m/z if left uncorrected.

One solution to the dead-time peak distortion is to keep the ion rates low enough that the peak distortions become negligible. However if the rates are too low, the sensitivity and the dynamic range are compromised, and the final analysis may be difficult to decipher from the noise level. Another solution is to apply statistical corrections to minimize the impact of dead-time, but these are typically only appropriate over a relatively limited range.

Several techniques have been proposed in recent years to address the problem inherent with ADC and TDC ion detection techniques. One technique utilizes a logarithmic (analogue) amplifier arranged in parallel with a TDC and also an integrating transient recorder. The TDC collects data and analyzes it in respect of very small ion concentrations whilst the transient recorder is able to analyze data in respect of much high ion concentrations without saturation. The dynamic range of the data acquisition system overall is thus much larger than that of a traditional TDC without sacrificing sensitivity at lower ion concentrations. However, the problems characteristic of ADC detectors identified above still remain at higher ion concentrations.

An alternative approach to the issues of sensitivity and dynamic range is to employ an array of adjacent but separate equal area anodes, with a separate TDC for each anode. This allows parallel processing of incoming ions, to increase the number of simultaneously arriving ions that are detected and thus to increase the dynamic range. The problem with this is that the increase in the quantity and complexity of the detection electronics increases the cost and, on average, an array of N detectors can only increase the total number of ions detected by a maximum number of N times.

To address this, two anodes of unequal area can be used. This extends the dynamic range of the detector since, with large numbers of a particular ion species arriving at the detector, the average number of ions detected on the smaller anode is small enough to reduce the effects of saturation. The larger anode, by contrast, can detect ions arriving with a lower concentration without an unacceptable loss of accuracy.

Other solutions to this problem include the use of micro-channel plate electron multipliers having collection electrodes (anodes) with different surface areas.

Such multiple detector techniques suffer from drawbacks, nevertheless. Firstly, physical cross-talk between the channels is inevitable. Due to the spatial spread of electron clouds created by the electron multiplier, only a part of the cloud may be collected on the smaller anode; similarly partial carry-over of electron clouds from the larger collector can take place. In addition, the close proximity of the anodes causes capacitive coupling between each which in turn increased the likelihood of electronic cross-talk. The multiplier voltage may collapse when very intense ion pulses are received, as is possible in, for example, inductively coupled plasma/mass spectrometry (ICP/MS) and gas chromatography/mass spectrometry (GC/MS). This results in reduced sensitivity for subsequent mass peaks. Finally, the ratio of "effective areas" may depend heavily on parameters of the incoming ion beam (which in turn may depend upon space charge, ion source conditions etc.) which leads to a mass dependence upon the ratio. This problem is particularly pronounced in narrow ion beams such as are produced in orthogonal acceleration TOFMS.

The last problem outlined above can be addressed by employing a multitude of similar collectors after a common multiplier, connecting each collector to a separate TDC channel. Whilst this solution does largely remove the mass dependence upon the ratio of anode areas, it fails to address the other problems with this multiple detector arrangement, and also extends dynamic range only by a factor equal to the number of channels. Thus, this solution can become complex and even then may not be adequate for certain applications such as gas chromatography/mass spectrometry (GC/MS).

Yet another alternative is to employ an arrangement that comprises two channel type electron multipliers in series, together with an intermediate anode. The intermediate anode intercepts the majority of electrons generated by the first multiplier and allows these minority of electrons which are not intercepted to be captured by the second electron mulitiplier. The analogue amplifier generates a first detector output for the anode, and a discriminator and pulse counter generates a second detector output from the second electron multiplier. The outputs of the two detectors are then combined. Once again, this technique suffers from physical and electronic cross-talk.

In operation of a TOFMS, therefore, the operator has to deal with the competing goals of delivering as high an absolute ion rate as possible to the TOFMS, for best sensitivity, but not so high as to saturate the detection system. When dealing with internal mass standards for high mass accuracy measurements, this problem is further compounded by the need to match closely the relative intensities of the internal standard and the analytes of interest.

SUMMARY

The present invention provides a method and an apparatus for controlling the ion population in a mass spectrometer. In one aspect of the invention, a method and an apparatus for controlling the ion population in a TOFMS is provided.

In one aspect, the invention is directed to a method of controlling the population of ions in a mass spectrometer. The method includes providing a first sample of ions in the mass spectrometer, determining a measure of abundance of a species of interest in the first sample of ions, and introducing a second sample of ions into the mass spectrometer, the second sample of ions being introduced in an amount determined at least in part on the measure of abundance of the species of interest in the first sample of ions.

In another aspect, the invention is directed to method of controlling the population of ions in a time-of-flight mass spectrometer. The method includes providing a first sample of ions in a substantially quadrupolar ion trap, determining a measure of abundance of a species of interest in the first sample of ions, introducing a second sample of ions into the ion trap, introducing the second sample of ions at over a predetermined time interval into the time-of-flight mass spectrometer, and analyzing the second sample of ions. The second sample of ions is introduced in an amount determined at least in part on the measure of abundance of the species of interest in the first sample of ions.

In another aspect, the invention is directed to a mass spectrometer that has an ion source, a mass analyzer, and an ion accumulator to receive and store ions from the ion source. The ion accumulator is configured to determine the abundance of a species of interest in a first sample of ions, and introduce a second sample of ions into the mass analyzer in an amount determined at least in part on a measure of abundance of the species of interest in first sample of ions.

Implementations of the above inventions may include one or more of the following features. The second sample of ions may be introduced into the mass spectrometer from a source of ions over a time interval, and the time interval may be determined based at least in part on the measure of abundance of the species of interest in the first sample of ions. The measure of abundance may be an intensity value measured for a signal associated with the species of interest in the first sample of ions, and may include determining whether the abundance of the ions exceeds a threshold value. The amount of second sample being introduced may be determined at least in part based on ions with a mass-to-charge ratio within a range of interest. The second sample of ions may be used for a prescan experiment. Ions may be introduced from a source of ions into the mass spectrometer, and the received ions may be accumulated in an ion trap. The first sample of ions may include the accumulated received ions. The accumulated ions may be fragmented to generate a population of daughter ions, and the first sample of ions may include the population of daughter ions. The second sample of ions may be accumulated in the ion trap, and ions in the second sample of ions may be fragmented to generate a second population of daughter ions. The first sample of ions may be introduced in an ion trap, the second sample may be accumulated in the ion trap, and substantially all of the first sample of ions may be removed from the ion trap before accumulating the second sample of ions. The amount may correspond to an ion population such that an ion detector of the mass spectrometer will not be saturated by a signal associated with the species of the ion population, such that the detector electronics of the mass spectrometer will not be saturated by a signal associated with the species of the ion population, or such that a predetermined space charge constraint is satisfied. The amount may correspond to an ion population such that the probability of an ion arriving at a detector during the dead-time of the detector and/or its associated electronics is substantially reduced. The dead-time may be associated with a time to digital converters (TDC) in the detector arrangement. The amount may correspond to an optimum ion population for operation of the mass spectrometer. The second sample of ions may be used to provide an optimum population of ions for a subsequent mass analysis in a subsequent mass spectrometer. A population of ions in or derived from the second sample of ions may be determined, and an analysis time interval may be determined based on the determined population of ions, the analysis time interval representing a time required to accumulate the optimum population of ions for the subsequent mass analysis. Ions may be introduced into the mass spectrometer for a time corresponding to the analysis time interval. A total ion current for the ions in or derived from the second sample of ions may be calculated. Ions in or derived from the second sample of ions may be transmitted to a subsequent mass spectrometer. The amount may be selected as a function of a mass accuracy desired in an analysis of the transmitted ions in the subsequent mass spectrometer. The mass accuracy may be better than 20 ppm. Steps (a) through (c) may be performed in the order recited. The mass spectrometer may be an RF quadrupole ion trap mass analyzer, an ion cyclotron resonance mass analyzer, an orbitrap mass analyzer or a time-of-flight mass analyzer. The species of interest may be the most abundant species, a predetermined species, the most abundant species from a predetermined list of species, or the most abundant species that is not on a predetermined list of species. The second sample of ions may be accumulated in an ion accumulator before the step of introducing the second sample of ions into the time-of-flight analyzer. The first sample of ions may be provided over a first time interval, the measure of abundance may be determined at a predetermined time from the start of the first time interval, the second sample of ions may be introduced over a second time interval, and the optimum population of ions being may be substantially met at the predetermined time from the start of the second time interval.

In another aspect, the invention is directed to a computer program product tangibly embodied in a computer readable medium with instructions to control a mass spectrometer according to the methods above.

BRIEF DESCRIPTION OF THE DRAWINGS

In the accompanying drawings:

FIG. 4 is a schematic diagram of an apparatus for controlling the ion population in a subsequent mass spectrometer according to an alternative aspect of the invention.

FIG. 5 is a schematic diagram of an apparatus for controlling the ion population in ion trap mass spectrometer according to yet another alternative of the invention.

DETAILED DESCRIPTION

Figure 1:
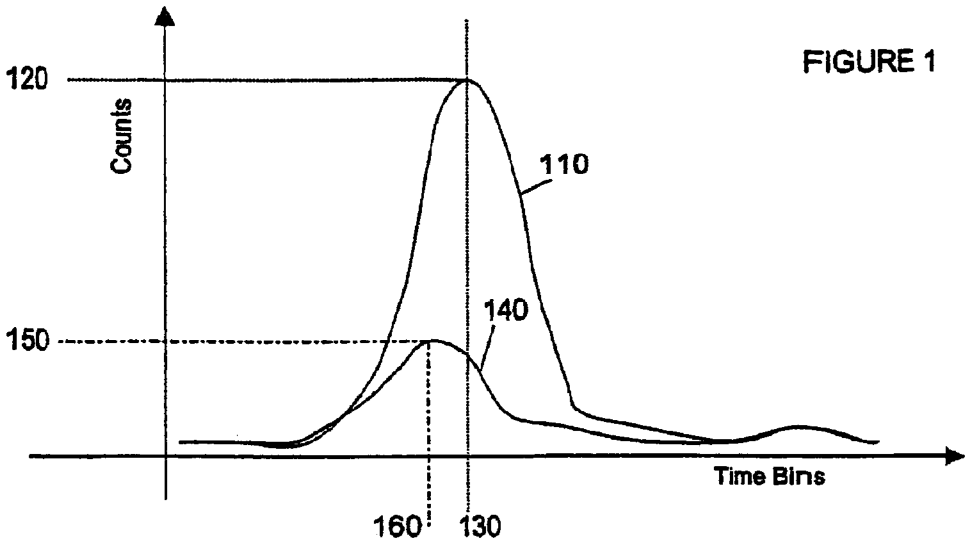
FIG. 1 illustrates how dead-time causes suppression of the area of the peak, and a shift to lower arrival times.

Unless otherwise defined, all technical and scientific terms used herein have the meaning commonly understood by one of ordinary skill in the art to which this invention belongs. All publications, patent applications, patents, and other references mentioned herein are incorporated by reference in their entirety. In case of conflict, the present specification, including definitions, will control. The disclosed materials, methods, and examples are illustrative only and not intended to be limiting. Skilled artisans will appreciate that methods and materials similar or equivalent to those described herein can be used to practice the invention.

Exemplary embodiments of the invention will now be described and explained in more detail with reference to the embodiments illustrated in the drawings. The features that can be derived from the description and the drawings may be used in other embodiments of the invention either individually or in any desired combination.

Figure 2:
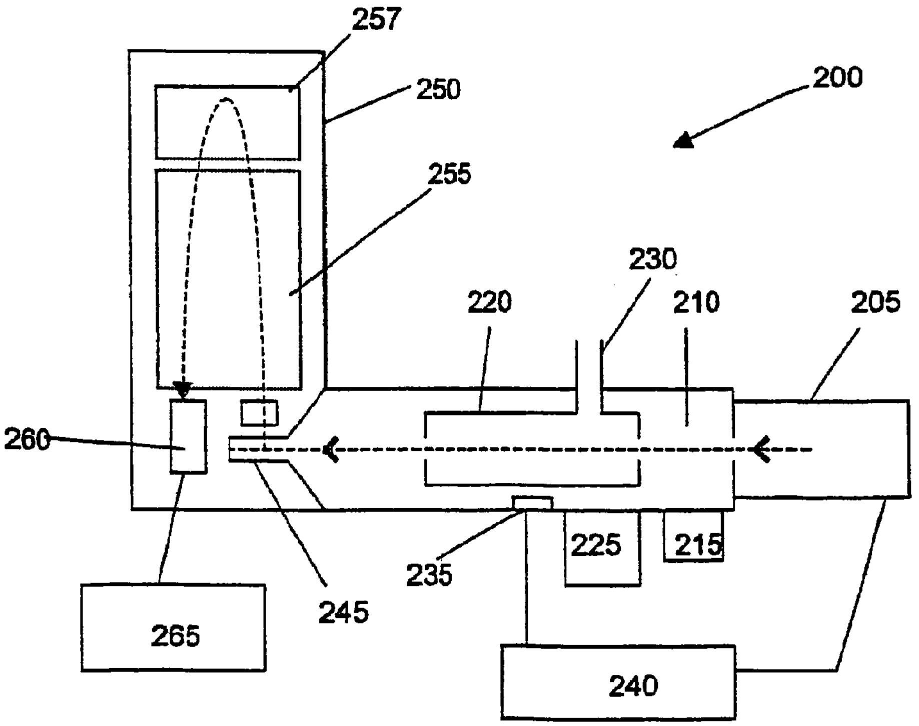
FIG. 2 is a schematic diagram of an apparatus for controlling the ion population in a time-of-flight mass spectrometer according to an aspect of the invention.

FIG. 2 illustrates an apparatus 200 that can be used to control the ion population of the time-of-flight mass spectrometer (TOFMS) according to one aspect of the invention. An ion source 205 may be any conventional continuous or pulsed source, such as an ion spray, an electrospray ion source, an electron impact source, a chemical ionization source, APCI or MALDI source, which generate ions from material received from, for example, a liquid chromatograph (not shown). Indeed, the ion source 205 may in fact be an upstream stage in an ms/ms analysis, e.g. a quadruopole mass spectrometer or an ion trap.

In essence, the ions created for use in an TOFMS can be created in a "pulsed" form, created in a very short time interval (several ns) or can be accumulated for a certain time interval (typically in the Us range), and then ejected or extracted into the TOFMS.

Ions provided by the ion source 205 proceed (directly or indirectly) into a first chamber 210 which is evacuated to a first pressure below atmospheric pressure by a first pump 215. As used in this specification, "provided" encompasses introducing, and the introduction of ions can be by formation inside the first chamber 210 or the ion accumulator 220, or formation outside these elements with the ions then being transported into the first chamber 210 or the ion accumulator 220.

The ions exit the first chamber 210 into an ion accumulator 220, which is likewise evacuated, but to a lower pressure than the pressure within the extraction chamber 210, also by a second pump 225. The ion accumulator 220 functions to accumulate ions derived from the ions generated by ion source 205.

The ion accumulator 220 can be, for example, in the form of a multipole ion guide, such as an RF quadrupole ion trap or a RF linear multipole ion trap, or a RF "ion tunnel" comprising a plurality of electrodes configured to store ions and having apertures through which ions are transmitted. Where ion accumulator 220 is an RF quadrupole ion trap, the range and efficiency of ion mass to charge (m/z's) captured in the RF quadrupole ion trap may be controlled by, for example, selecting the RF and DC voltages used to generate the quadrupole field, or applying supplementary fields, e.g. broadband waveforms. A collision or damping gas such as helium, nitrogen, or argon, for example, can be introduced via inlet 230 into the ion accumulator 220. The neutral gas provides for stabilization of the ions accumulated in the ion accumulator.

In the implementation illustrated in FIG. 2, ion accumulator 220 is configured to radially eject the accumulated ions towards sample detector 235, and its associated electronics/processing unit 240. The sample detector 235 detects the ejected ions. Sample detector 235 can be any conventional detector that can be used to detect ions ejected from ion accumulator 220. In one implementation, the sample detector 235 can be an external detector, such as an electron multiplier detector or an analogue electrometer, and ions can be ejected from ion accumulator 220 in a direction transverse to the path of the ion beam towards the mass analyzer.

Ion accumulator 220 can also be configured to eject ions axially towards a time-of-flight mass spectrometer 250 (optionally passing through ion transfer optics which are not shown) where the ions can be analyzed.

Ions ejected from the ion accumulator 220 are subsequently accelerated to the required energy and focused by ion optics (not shown) into a substantially parallel beam as they enter the time-of-flight mass spectrometer (TOFMS) 250. At the entrance of the TOFMS, commonly referred to as the pusher 245, the ions are pushed or influenced in a direction substantially orthogonal to their original path in bunches, and enter the drift region 255, the dominant area of the TOFMS.

A linear drift region as opposed to an orthogonal drift region could be employed if so desired. At the end of the drift region 255, as illustrated, there is a reflection type arrangement 257 which includes a mirror that alters the direction of travel of the ions so that they travel toward and are detected by the ion detector 260 and its associated electronics/processing unit 265. The ion detector 260 generates a signal that is typically passed though some pulse shaping and amplification electronics to the counting electronics within the processing unit 265 where the pulses are recorded.

The time of flight of the ions in the spectrometer is measured by comparing the time between a start indicator and a stop indicator. The start indicator is generally initiated by the time at which the pulse of ions is pushed by the pusher 245 into the drift region 255. The stop indicator comes from the signal that is generated by the ion detector 260. These indicators provide the output of the TOFMS 250 which displays the data as a histogram of ion intensities against the time of flight.

For the arrangement discussed, typically pre-experiment (or pre-scan) automatic gain control (AGC) measurements measure the total charge (or total ion current, TIC) injected into the ion accumulator 220 during a fixed pre-scan injection period. The TIC value is then used to improve the control of the average rate of ions injected into the ion accumulator 220. However, this approach does not take into account the abundance of any particular m/z, the number or intensity of the peaks present in the spectrum, and hence the rate of ions that are conveyed to the TOFMS per measurement bin.

In this invention, a method is provided to control the population of ions provided to the TOFMS 250. One aspect of this invention provides for substantial reduction, and preferably elimination of the probability that ions will reach the ion detector 260 during the dead-time associated with the ion detector 260 and/or its associated electronics 265.

In another aspect of the invention, a method is provided to control the population of ions provided to the TOFMS 250 such that saturation of the ion detector 260 by the ion population is substantially reduced, and preferably eliminated. These aspects can be achieved by the method illustrated in FIG. 3.

Figure 3:
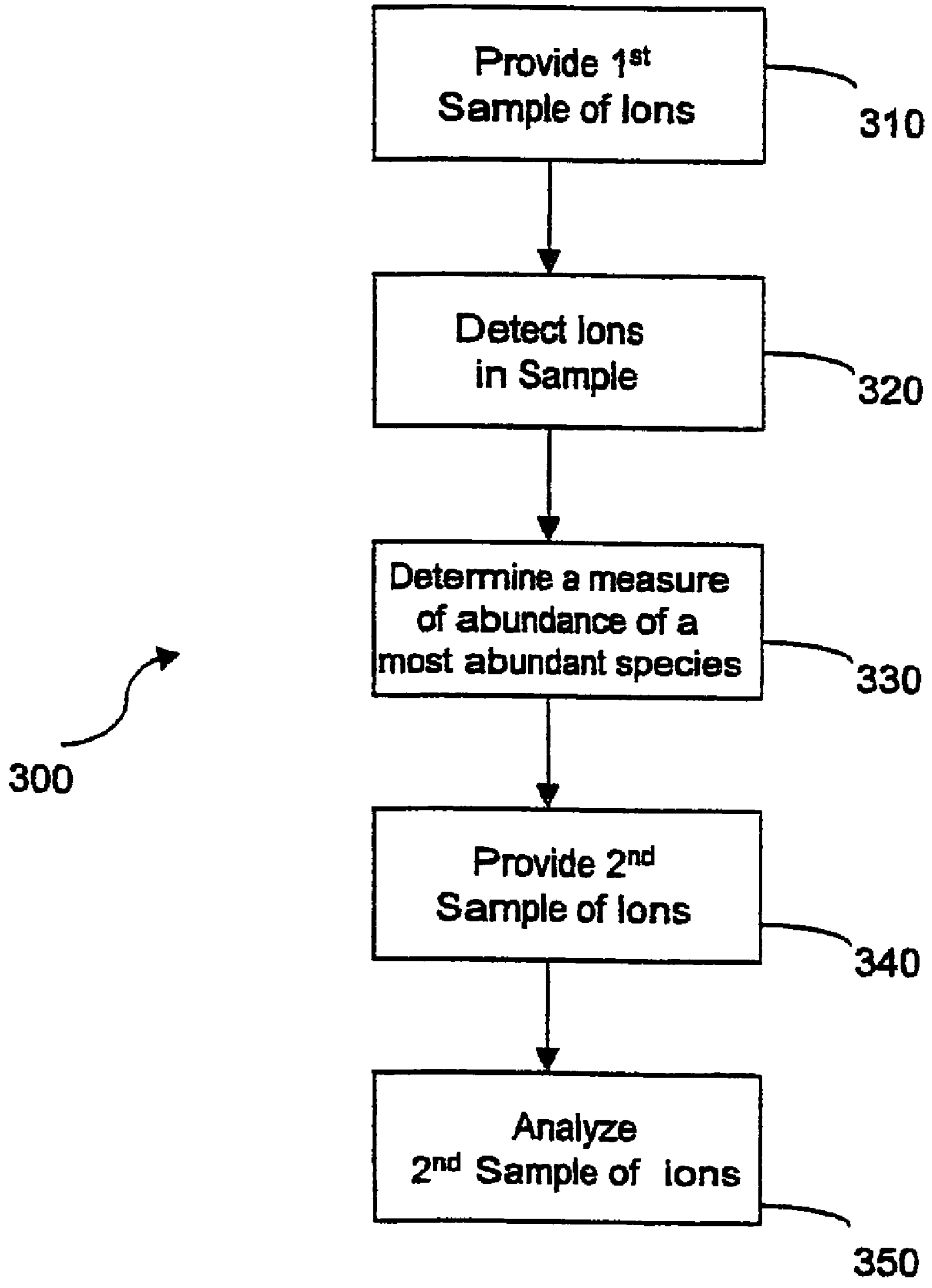
FIG. 3 is a flow diagram illustrating a method of controlling the ion population in a time-of-flight mass spectrometer according to an aspect of the invention.

FIG. 3 illustrates a method 300 of controlling the population of ions in a TOFMS in a system 200. The method begins with a pre-experiment, during which ions are produced by ion source 205 as described above. Ions derived from the produced ions provide a first sample of ions. In one aspect of the invention, the first sample of ions is provided from the ion source 205 over a specific time interval. In another aspect of the invention, the first sample of ions is provided by appropriate gating of the ion accumulator 220.

As used in this specification, ions "derived from" ions provided by a source of ions include the ions produced by the source of ions 205 as well as ions produced by subsequent manipulation of those ions (such as fragmentation or filtering for example). The first sample of ions can be relatively small, and will generally be sufficient to provide enough ions to the ion accumulator 220 for the subsequent detection steps of the pre-experiment.

As discussed previously, the ion accumulator 220 may be a substantially quadrupolar ion trap. In one aspect of the invention, substantially all the accumulated ions are then ejected from ion accumulator 220 and passed on to the sample detector 235 (step 320) for detection. In another aspect of the invention, only ions within a predetermined mass-to-charge ratio are ejected from the ion accumulator 220 and passed to the sample detector 235. Preferably, any ions remaining after this ejection process should be extracted from ion accumulator 220 before ions are next accumulated in ion accumulator 220.

The detected ejected ion signal generated by sample detector 235 is used to determine a measure of abundance of a species of interest in this first sample of ions (step 330). Conversely, the measure of abundance is not dependent on the abundance of at least some species other than the species of interest from the sample. The species of interest (the identity of which need not be known prior to the measurement) may be a predetermined species, the most abundant species, the most abundant species from a predetermined list of species, or the most abundant species that is not on a predetermined list of species.

This measurement of abundance can be an intensity value, e.g., a measurement of intensity, such as the base peak intensity (a measure of abundance of a most abundant species) of the signal generated. The intensity value can also be a measure of whether the signal generated surpasses a predetermined threshold value. In general, the intensity value corresponds to an instantaneous ion rate, e.g., the instantaneous signal intensity, rather than a total number of ions, e.g., a total derived by integrating the signal (since the peaks in the instantaneous ion rate create the danger of dead-time or saturation).

The predetermination of the species or list of species may comprise acquisition of data, e.g., via pre-analysis experiment, pre-scan experiment, or simulation, followed by manual or automatic application of selection criteria to the data, and can be performed at the operator or at the manufacturer. The predetermination of the species or list of species can also comprise a manual selection by an operator based on a priori knowledge. As one example, the predetermined species may be the most abundant species in a pre-analysis experiment, a pre-scan experiment or a simulation. As another example, the operator could simply select a species based on knowledge of the sample or carrier material (e.g., a matrix or solvent that carries the sample), and knowledge of the ion species generated by that sample or carrier material.

If the species of interest is the most abundant species, then the species can be determined by a computer in real-time based on the ejected ion signal.

The relationship between the base peak intensity from a pre-scan of an ion trap (220), and the ion arrival rate at the TOF detector 260 is substantially reproducible, and therefore amenable to standard instrument calibration procedures. From such a calibration one can determine the appropriate AGC target values and bleed times from the ion accumulator 220 to deliver an optimum ion population, or an optimum rate of ions for the ion associated with the base peak intensity in the spectrum. All less intense ions in the spectrum must by definition be present at levels lower than the saturation level of the ion detector 260.

The determination is typically based on several factors. For example, for a TOFMS, the loss of ions experienced by the ion population as it leaves the ion accumulator 220 and arrives at the ion detector 260 can typically be in the range of 20-30 percent (this is effectively the transmission efficiency). The duty cycle of the TOFMS system is typically in the region of 5-30 percent); The duty cycle is the percentage of the time that ions can be injected from ion accumulator 220 into the TOFMS 250. This percentage is based on the fact that once injected, the ions have to travel through the TOF part of the system. For example, assuming a transmission efficiency of 20% (typically in the range of 5 to 75%) and a duty cycle of 25% (typically in the range of 5 to 50%), one therefore has a total efficiency of 5% for the TOFMS.

If the electronics 265 associated with the ion detector 260, for example the TDC electronics, can accept no more than 1 ion per pulse or shot of ions from the ion source 205, by allowing ions to be ejected from the ion accumulator 220 and into the TOFMS 250 for 10 ms, and with a TOF cycle time of 100 μs; then the ions ejected equate to 100 TOF cycles, which equates to saturation level of 100 ions for the TDC for this time period. Hence, if the maximum ion population equates to 100 ions, assuming 5% total efficiency, the target value for the peak ion intensity is 2000. It will be appreciated that depending upon the mass accuracy required, the actual detected ion arrival rate may be considerably less that that identified above.

Continuing the example, if the base peak intensity is measured to be 50, we are able to determine that we need to provide ions for a time that equates to 40 times as long as the pre-scan time, in order to reach the target value of peak ion intensity, or (10 ms×40)=0.4 s.

A second sample of ions is then provided (step 340) into the TOFMS 250. In one aspect of the invention, the second sample of ions is pulsed directly over a short time interval into the TOFMS 250. The second sample of ions is produced in an amount that has been determined at least in part on the measure of abundance of the species of interest from the first sample of ions. In another aspect of the invention, the second sample of ions is accumulated in the ion accumulator 220 typically over a longer period of time. This second sample of accumulated ions is then transferred to the TOFMS for final analysis by bleeding the ion accumulator at a specified ion ejection rate (step 350). Once again, the second sample of ions introduced into the TOFMS represents the population of ions that must be supplied to the ion accumulator 220 such that the ion accumulator 220 accumulates a desired population of ions (after initial processing or manipulations) to optimize the performance of the time-of-flight mass spectrometer 250.

As discussed earlier, optimum performance in the case of a TOFMS generally translates to avoidance of saturation of the ion detector 260, or avoidance of saturation of the detector electronics or processing unit 265. Optimum performance can also correspond to the rate at which ions are introduced into the TOFMS, to ions not arriving during the dead-time of a previous ion, and dead-time not being needlessly extended, to name but a few. Optimum performance typically enables a greater dynamic range and better sensitivity to be achieved. In essence, optimum performance ultimately means no peak shift or amplitude distortion will occur due to the absence of these defects.

The invention can be applied to internal mass standards as well as to unknown compounds of analytical interest. The invention allows a high degree of flexibility in the relative concentrations of internal mass standards and samples. The ion accumulator 220 can be set to a Selected Ion Monitoring (SIM) scan mode at any chosen time interval (for example, every fifth analytical scan), with guaranteed optimum ion rate for the chosen ion, and hence optimum mass accuracy. The benefit is relatively independent of the absolute intensity level of the internal standard introduced into the mass spectrometer.

In order to introduce an amount of ions in the second sample of ions that is determined at least in part on the measure of abundance of the species of interest in the first sample of ions, the ion accumulator 220 may need to be only partially filled or filled more than once. That is, the ion accumulator 220 may be opened to the stream of ions from ion source 205 for a time period less than the time required to fill the ion accumulator 220 to its full capacity. Alternatively, it may be necessary to fill the ion accumulator multiple times in order to accumulate for the determined injection time interval (e.g., if the accumulator cannot accommodate the amount of ions that would be introduced from the ion source 205 during the full injection time interval). In this case, the accumulated ions can be stored elsewhere until the desired secondary accumulator population is reached.

In yet another aspect of the invention, a predetermined calibration table can be utilized, and depending upon the mass accuracy or resolution required, one can determine the rate at which ions need to enter the TOFMS to attain the results required.

For a given level of required mass accuracy there is a statistically determined maximum rate of ions that the detection system can work with. That is, if you want 2 ppm or 5 ppm mass accuracy, you must work with a significantly less intense beam that if you only require 10 ppm or 20 ppm. A less intense beam limits the absolute sensitivity of the system. The AGC-trap-TOF approach described above allows this trade-off to be explicitly controlled by the instrument operator. One can simply select a lower AGC target for higher mass accuracy experiments, and select a higher AGC target for lower mass accuracy experiments. This relationship is reproducible, and therefore amenable to standard calibration procedures. A benefit of the AGC-trap-TOF approach described above is that it enables the user to control the trade-off between mass accuracy, sensitivity and analytic scan time.

The invention enables the dynamic range of the TOFMS to be changed in real-time, at-will, enabling saturation of the detector electronics and dead-time issues to be avoided.

FIG. 4 illustrates an apparatus 400 and that can be used to control the ion population of any subsequent mass spectrometer 450 according to another aspect of the invention. The figure is similar in almost every respect except that a time-of-flight mass spectrometer 250 is not illustrated. In its place, any subsequent mass spectrometer 450 can be inserted, including a second substantially quadrupolar ion trap, a linear ion trap, an orbitrap, or FT/ICR.

The system operates in a similar fashion to that described in FIG. 3. The method begins with a pre-experiment, during which a first sample of ions is produced and subsequently accumulated by appropriate gating of either the ion accumulator 220 or the source itself. The first sample of ions can be relatively small, and will generally be sufficient to provide enough ions for the subsequent detection steps of the pre-scan.

The accumulated ions are extracted or ejected to the sample detector 235, and an ion signal generated to determine the abundance of a species of interest in this sample of ions. The species of interest may be a predetermined species, the most abundant species, the most abundant species from a predetermined list of species, or the most abundant species that is not on a predetermined list of species. The species of interest does not have to apply to a resolved isotope, it may a measurement of the average intensity over a range of resolvable isotopes, a measurement of the average intensity of multiple peaks over a predetermined range. This measurement of abundance can be a measurement of an absolute intensity, the base peak intensity of the signal generated, or can be a measure of whether the signal generated surpasses a predetermined threshold value.

Based on this peak abundance measurement, the multiple or portion of the pre-scan time for which a second sample of ions needs to be produced is determined, in order to ascertain the optimum target ion population for eventual transfer to the subsequent mass spectrometer. The second sample of ions in then produced and directly injected into the subsequent mass spectrometer 450 for analysis (bypassing the ion accumulator 220) over the determined time duration. Alternatively, the second sample of ions is accumulated typically in the ion accumulator 220 or a subsequent ion accumulator, and the accumulated ions are then ejected into the subsequent mass spectrometer 450 over an appropriate time interval. The appropriate time interval would be such that the subsequent mass spectrometer's performance was optimized, and optimization may include that neither its detector 260 nor the associated detector electronics is saturated.

Optimum performance may also relate to different criteria such as avoidance of excessive space charge, space charge constancy over a number of measurements, adaptation to special characteristics of the subsequent mass analyzer, and the like. Hence the optimum performance of a device is generally defined by an upper and a lower limit of ion population. Thus, for example, for low ion populations in the mass analyzer, it can be difficult to differentiate the detected population of ions from the noise level. Increasing the population of ions in the mass spectrometer can avoid this problem. For high ion populations in the mass spectrometer, increasing the population of ions too far can lead to space charge problems, resulting in deterioration in m/z assignment accuracy.

FIG. 5 illustrates an apparatus 500 that can be used to control the ion population in an ion trap mass spectrometer according to another aspect of the invention. The figure is similar in almost every respect to FIGS. 2 and 4, except that no time-of-flight mass spectrometer 250 and no subsequent mass spectrometer 450 is illustrated. Instead, the ion accumulator 220 is such that it functions as both an accumulator and a mass spectrometer. Once again, the ion accumulator may be a substantially quadrupolar or multipolar ion trap, a linear ion trap, an orbitrap or FT/ICR.

Once again ions are provided by the ion source 205 during the prescan time, and eventually accumulate in the substantially quadrupolar ion trap 220. The accumulated ions can only be extracted or ejected towards the sample detector 235. The ejected ions generate an ion signal which is used to determine the abundance of a species of interest in this sample of ions. The species of interest may be a predetermined species, the most abundant species, the most abundant species from a predetermine list of species, or the most abundant species that is not on a predetermined list of species. This measurement of abundance can be a measurement of an absolute intensity, the base peak intensity of the signal generated, or can be a measure of whether the signal generated surpasses a predetermined threshold value.

Based on this peak abundance measurement, the multiple or portion of the pre-scan time for which a second sample of ions needs to be produced is determined, in order to ascertain the optimum target ion population for the ion trap 220. The second sample of ions in then produced, directly injected and accumulated into the ion trap 220 for analysis over the determined time duration. Once again, the appropriate time duration would be such that the ion trap's 220 performance was optimized. The second sample of ions can be used for acquisition of an analytical mass spectrum, or can be used for a prescan which controls subsequent operating parameters of the mass spectrometer.

It is to be understood that while the invention has been described in conjunction with the detailed description thereof, the foregoing description is intended to illustrate and not limit the scope of the invention, which is defined by the scope of the appended claims. Those skilled in the art will, of course, be able to combine the features explained on the basis of the various exemplary embodiments and, possibly, will be able to form further exemplary embodiments of the invention. Other aspects, advantages, and modifications are within the scope of the following claims.

The invention claimed is:

1. A method of avoiding saturation of at least one of an ion detector, ion detector electronics or a processing unit in a mass spectrometer, the method comprising:

(a) providing a first sample of ions in the mass spectrometer;

(b) determining an instantaneous intensity value of a species of interest in the first sample of ions; and (c) introducing a second sample of ions into the mass spectrometer, the second sample of ions being introduced in an amount determined based on the instantaneous intensity value of the species of interest in the first sample of ions.

2. The method of claim 1, wherein:

introducing the second sample of ions includes introducing the second sample of ions into the mass spectrometer from a source of ions over a time interval, the time interval being determined based at least in part on the instantaneous intensity value of the species of interest in the first sample of ions.

3. The method of claim 1, wherein:

the measure of the instantaneous intensity value comprises determining whether the intensity value of the ions exceeds a threshold value.

4. The method of claim 1, wherein:

the amount of second sample being introduced is determined at least in part based on ions with a mass-to-charge ratio within a range of interest.

5. The method of claim 1, wherein:

the second sample of ions is used for a prescan.

6. The method of claim 1, wherein:

providing the first sample of ions includes:

introducing ions from a source of ion into the mass spectrometer; and accumulating the received ions in an ion trap.

7. The method of claim 6, wherein:

the first sample of ions includes the accumulated received ions.

8. The method of claim 6, further comprising:

fragmenting the accumulated ions to generate a population of daughter ions, the first sample of ions including the population of daughter ions.

9. The method of claim 8, wherein:

introducing the second sample of ions includes accumulating the second sample of ions in the ion trap;

the method further comprising fragmenting ions in the second sample of ions to generate a second population of daughter ions.

10. The method of claim 1, wherein:

introducing a first sample of ions includes introducing the first sample of ions in an ion trap; and introducing a second sample of ions includes accumulating the second sample of ions in the ion trap;

the method further comprising removing substantially all of the first sample of ions from the ion trap before accumulating the second sample of ions.

11. The method of claim 1, wherein:

the amount to an coresponding amount such that an ion detector of the mass spectrometer will not be saturated by a signal associated with the species of the ion population.

12. The method of claim 1, wherein:

the amount corresponds to an amount such that detector electronics of the mass spectrometer will not be saturated by a signal associated with the species of the ion population.

13. The method of claim 12, wherein:

saturation is associated with one or more analogue to digital converter (ADC) in the detector arrangement.

14. The method of claim 1, wherein:

the mass spectrometer comprises a detector and associated detector electronics; and the amount is an amount corresponding to an ion population such that the probability of an ion arriving at the at least one of the detector or the detector electronics during dead-time of the detector or the detector electronics is substantially reduced.

15. The method of claim 14, wherein:

the dead-time is associated with one or more time to digital converter (TDC) in the detector arrangement.

16. The method of claim 1, further comprising:

using the second sample of ions to provide the amount is an amount corresponding to an optimum ion population for operation of the mass spectrometer.

17. The method of claim 1, further comprising:

using the second sample of ions to provide an optimum population of ions for a subsequent mass analysis in a subsequent mass spectrometer.

18. The method of claim 17, wherein:

using the second sample of ions includes determining a population of ions in or derived from the second sample of ions and determining an analysis time interval based on the determined population of ions, the analysis time interval representing a time required to accumulate the optimum population of ions for the subsequent mass analysis;

the method further comprising introducing ions into the mass spectrometer for a time corresponding to the analysis time interval.

19. The method of claim 18, wherein:

determining a population of ions in or derived from the second sample of ions includes calculating a total ion current for the ions in or derived from the second sample of ions.

20. The method of claim 1, further comprising:

transmitting ions in or derived from the second sample of ions to a subsequent mass spectrometer.

21. The method of claim 20, wherein:

the amount is selected as a function of a mass accuracy desired in an analysis of the transmitted ions in the subsequent mass spectrometer.

22. The method of claim 21, wherein:

the mass accuracy is better than 20 ppm.

23. The method of claim 1, wherein:

the steps (a) through (c) are performed in the order recited.

24. The method of claim 1, wherein:

the mass spectrometer comprises an RF quadrupole ion trap mass analyzer, an ion cyclotron resonance mass analyzer, an orbitrap mass analyzer or a time-of-flight mass analyzer.

25. The method of claim 1, wherein the species of interest is the most abundant species.

26. The method of claim 1, wherein the species of interest is a predetermined species.

27. The method of claim 1, wherein the species of interest is the most abundant species from a predetermined list of species.

28. A method of avoiding saturation of at least one of an ion detector, ion detector electronics or a processing unit in a time-of flight mass spectrometer, the method comprising:

(a) providing a first sample of ions in a substantially quadrupolar ion trap;

(b) determining an instantaneous intensity value of a species of interest in the first sample of ions;

(c) introducing a second sample of ions into the ion trap, the second sample of ions being introduced in an amount based on the instantaneous intensity value of the species of interest in the first sample of ions;

(d) introducing the second sample of ions over a predetermined time interval into the time-of-flight mass spectrometer; and (e) analyzing the second sample of ions.

29. The method of claim 28, further comprising:

accumulating the second sample of ions in an ion accumulator before the step of introducing the second sample of ions into the time-of-flight analyzer.

30. The method of claim 28, wherein:

the first sample of ions is provided over a first time interval, and the instantaneous intensity value is determined at a predetermined time from the start of the first time interval; and the second sample of ions is introduced over a second time interval, the optimum population of ions being substantially met at the predetermined time from the start of the second time interval.

31. The method of claim 28, wherein the species of interest is the most abundant species.

32. The method of claim 28, wherein the species of interest is predetermined.

33. The method of claim 28, wherein the species of interest is the most abundant species from a predetermined list of species.

34. A mass spectrometer, comprising:

an ion source;

a mass analyzer; and an ion accumulator to receive and store ions from the ion source, wherein the ion accumulator is configured to determine an instantaneous intensity value of a species of interest in a first sample of ions, and introduce a second sample of ions into the mass analyzer in an amount determined based on the instantaneous intensity value of the species of interest on the first sample of ions.

35. The apparatus of claim 34, wherein the species of interest is the most abundant species.

36. The apparatus of claim 34, wherein the species of interest is predetermined.

37. The apparatus of claim 34, wherein the species of interest is the most abundant species from a predetermined list of species.

38. A computer program product tangibly embodied in a computer readable medium, comprising instructions to control a mass spectrometer to:

(a) provide a first sample of ions in the mass spectrometer;

(b) determine an instantaneous intensity value of a species of interest in the first sample of ions; and (c) introduce a second sample of ions into the mass spectrometer, the second sample of ions being introduced in an amount determined based on the instantaneous intensity value of the species in the first sample of ions.

* * * * *

UNITED STATES PATENT AND TRADEMARK OFFICE

CERTIFICATE OF CORRECTION

PATENT NO. : 7,312,441 B2
APPLICATION NO. : 11/077105
DATED : December 25, 2007
INVENTOR(S) : Land et al.

It is certified that error appears in the above-identified patent and that said Letters Patent is hereby corrected as shown below:

Col. 12 line 64
replace "the amount to an corresponding amount"
with --the amount corresponds to an amount--

Col. 13 line 12
replace "the amount is an amount corresponding to an ion"
with --the amount corresponds to an ion--

Col. 13 lines 21-22
replace "using the second sample of ions to provide the amount is an amount corresponding"
with --using the second sample of ions to provide an amount corresponding--

Col. 14 line 46
replace "value of the species of interest on the first sample"
with --value of the species of interest in the first sample--

Signed and Sealed this

Ninth Day of December, 2008

JON W. DUDAS
*Director of the United States Patent and Trademark Office*